L. D. ASCOLI.
VACUUM CLEANER.
APPLICATION FILED JUNE 12, 1917.
1,324,635.
Patented Dec. 9, 1919.
2 SHEETS—SHEET 1.
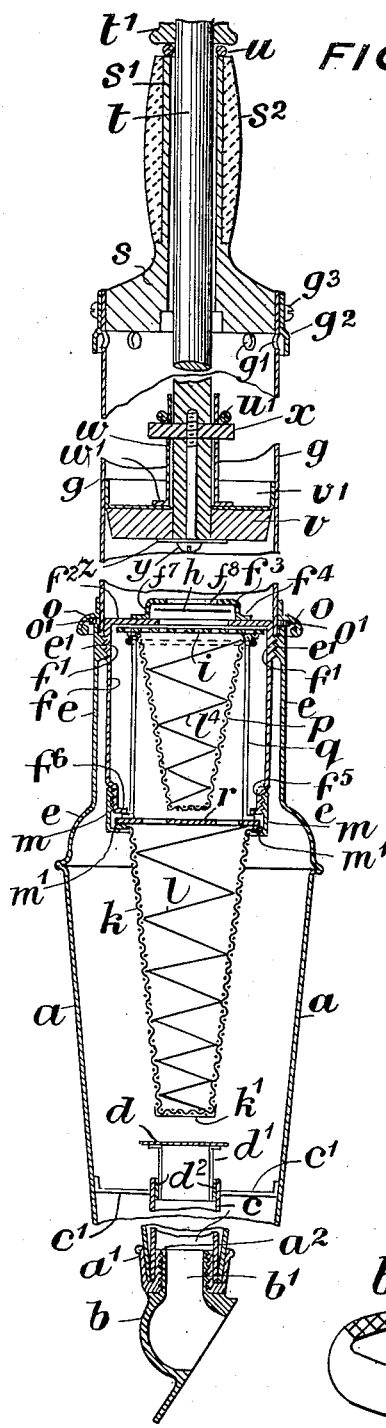
FIG.1.
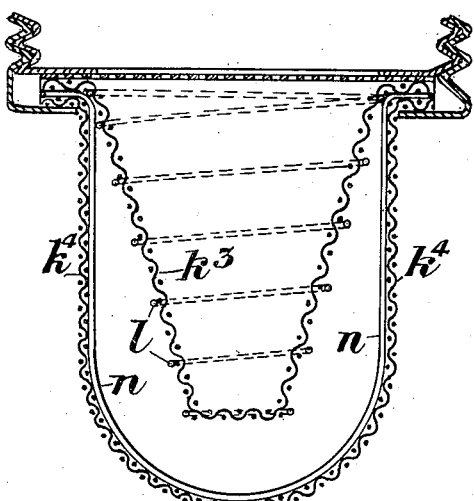
FIG.4.
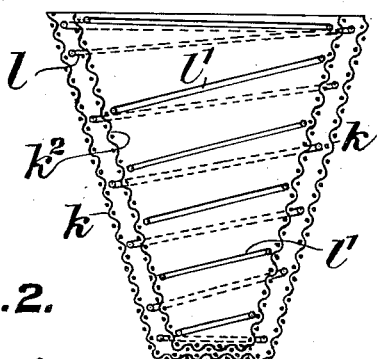
FIG.3.
FIG.2.
Inventor
Louis Daniel Ascoli
By Henry Orth Jr.
Atty.

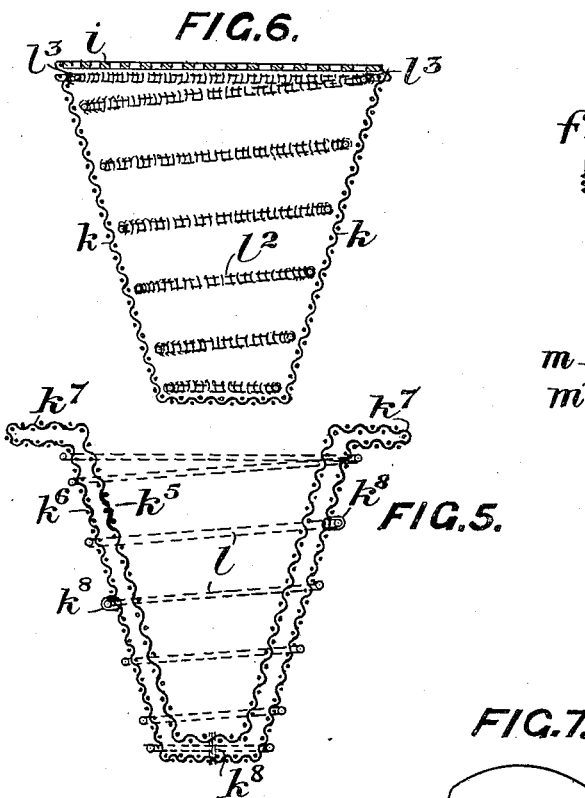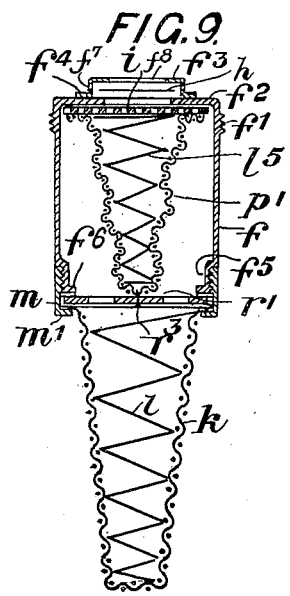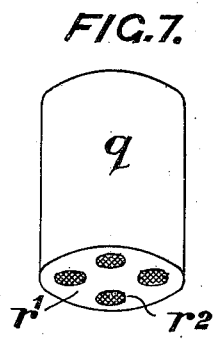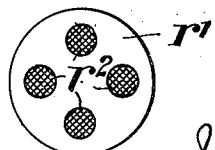

UNITED STATES PATENT OFFICE.

LOUIS DANIEL ASCOLI, OF HORNCHURCH, ENGLAND.

VACUUM-CLEANER.

1,324,635.    Specification of Letters Patent.    Patented Dec. 9, 1919.

Application filed June 12, 1917. Serial No. 174,261.

*To all whom it may concern:*

Be it known that I, LOUIS DANIEL ASCOLI, a subject of the King of Great Britain and Ireland, and residing at The Elms, Park-stone avenue, Hornchurch, in the county of Essex, in England, have invented certain new and useful Improvements in Vacuum-Cleaners, of which the following is a specification.

This invention relates to vacuum cleaners of the type, usually comprising a cylinder, a dust receptacle connected to the cylinder and a suction nozzle connected to the dust receptacle, a piston or plunger having a handle projecting out of or beyond the cylinder, a dust separator furnished with a filter bag for arresting the passage of dust and other foreign bodies and a suction valve or non-return valve between the dust separator and the piston.

The object of the present invention is to produce a vacuum cleaner of the aforesaid type, in which the dust, in the dust laden air, is very effectively separated from the air before it reaches the suction valve, in which the dust separator bag is adapted to more effectually free itself from dust or the like, which may adhere thereto, and in which other details of construction are such as to provide a very simple and easily assembled apparatus, which may be easily taken apart, and put together again, for instance, after having been emptied of dust, and which is, moreover readily re-assembled after disconnection and replacement of worn parts.

Figure 1 of the accompanying drawings is a longitudinal section of a single-acting, hand-operated vacuum cleaner, constructed according to this invention.

Fig. 2 is an inverted plan view of the suction nozzle or shoe.

Figs. 3, 4, 5 and 6 are sectional elevations, to a larger scale, of modified constructions of pulsating bags for the dust separator.

Fig. 7 is a detail perspective view of a frame for holding a dust separator bag in place.

Fig. 8 is a plan of a diaphragm having perforations covered with wire gauze or the like and Fig. 9 is a longitudinal section of another modified form of dust separator.

In carrying the invention into effect, the lower portion $a$ of the vacuum cleaner is, in known manner, and as shown in Fig. 1, made taper and serves as a receptacle for dust, fluff, pieces of cotton and other foreign bodies, all of which this apparatus is capable of picking up. The dust receptacle or collector $a$ is furnished as usual, at its smaller and lower end, with a suction nozzle or shoe $b$ (see also Fig. 2), connected by a screw $b'$ to a hollow externally taper cap $a'$ having an inwardly extending and internally screw-threaded cylindrical extension $a^2$, adapted to engage the screw $b'$ of the shoe or nozzle $b$. As shown in Fig. 2, the suction nozzle or shoe is provided, on the bottom surface, with a number of shallow intersecting grooves $b^2$ to aid in picking up pieces of cotton or the like from the carpet. A short piece of tube $c$ is conveniently soldered to the extension $a^2$ and the cap $a'$ is soldered to the dust collector $a$. The upper end of this suction tube $c$ opens into the dust receptacle and may, in known manner, be steadied in the dust receptacle by a wire stay or stays $c'$. If desired, a disk or deflector of metal, leather or other appropriate material, is conveniently mounted just above the upper end of the said tube. In this particular case, the disk $d$ is mounted on wires $d'$ soldered or otherwise fixed to a thin metal ring $d^2$ fitting friction-tight into the tube $c$. The object of the disk $d$ is to cause the dust-laden air to spread or be deflected and to thereby increase the tendency for the dust to fall down into the dust receptacle $a$ before coming into contact with the bag or bags of the dust separator.

The tapered dust receptacle has, at its upper end, a part spherical and cylindrical extension $e$, which is provided with a continuous or interrupted female screw thread $e'$ adapted to screw on to a correspondingly formed screw thread $f'$ near the upper end of the cylindrical dust separator casing $f$. The latter is suitably soldered at its upper end to the pump cylinder $g$, and, as best seen in Fig. 9, the casing $f$ is open at its lower end and provided at its upper end with a centrally perforated cover or diaphragm $f^2$ on which is mounted, as shown in Figs. 1 and 9, a perforated or open work cage $f^3$ having loosely mounted therein a disk $h$ of leather or other suitable material, adapted to act as a valve. The cage $f^3$ is suitably made of cup shape with a flange $f^4$, at the open end, and a number of radial openings $f^7$ in the sides, and a central axial hole $f^8$ at the other end. The cage, as shown, is made of perforated sheet metal stamped to shape.

If desired, the valve aperture in the upper end of the dust separator may be covered with wire gauze $i$, a piece of fabric or the like. The lower end of the dust separator casing $f$ is provided with the dust bag $k$, which consists of a piece of fabric supported internally or externally on a spiral spring $l$, the upper and largest convolution of which is suitably covered by the edge or hem of the mouth of the bag. The lower end of the dust separator casing is, conveniently, provided with a screw-thread $f^5$ and an inwardly projecting flange $f^6$, and a centrally perforated and screw-threaded cap $m$, screwed on to the said screw $f^5$, is adapted by its inwardly projecting flange $m'$ to clamp the largest convolution of the spring $l$ in position between such flanges and the inwardly projecting flange $f^6$ at the bottom of the dust separator casing $f$. If desired, and instead of mounting a disk $d$ above the upper end of the tube $c$, the end of the bag $k$ may be provided with a disk or deflector, which is then suitably made in the form of a cap $k'$ of leather or metal, sewn or otherwise fixed to the bag. A disk $r$ of wire gauze, fabric or the like may be interposed between the flange $f^6$ at the bottom of the separator casing and the hem or mouth of the bag. Furthermore, and as shown in Fig. 3, there may be a second bag $k^2$, on a spiral collapsible frame $l'$ within the first bag $k$, which is mounted on the spiral wire frame $l$. Or, as shown in Fig. 4, the bag $k^3$ may be attached to the inside of the collapsible frame $l$, while the other bag $k^4$ is mounted on the outside thereof, on a rigid frame $n$. As a matter of convenience, and as shown in Fig. 5, a double bag may consist of two more or less tapered bags $k^5$ and $k^6$, with their mouths joined at $k^7$, or they may be made in one piece or integral, one being turned inside out, so as to lie within the other, and the wire frame $l$ may be inside or, as shown, outside thereof, the bag $k^6$ being stitched at several places $k^8$ to the frame $l$, or the other bag $k^5$ or both the bags may be so connected. The convolutions of the spring or other frame for the bag $k$ may, as shown in Fig. 6, be covered with wool, felt, cotton, muslin or other suitable material, at $l^2$, to prevent the bag from wearing away too rapidly at those places where it comes into contact with the frame of the bag and, if desired, the spring frame may also be stitched or otherwise secured at $l^3$ to a disk $i$ of gauze or the like on, or in, the dust-separator casing. A joint is conveniently made between the said extension $e$ (Fig. 1) and the barrel or cylinder $g$ of the pump by means of an annular sleeve or flange $o$ on the barrel, having a washer or ring $o'$ of leather, india rubber, or other suitable material, against which the slightly flanged or beaded top of the extension $e$ abuts, when screwed up tight on the dust separator casing $f$.

If desired, this construction of vacuum cleaner may, furthermore, be provided with a second collapsible, dust- or filter-bag $p$, mounted on a spiral frame $l^4$. The circular edge of the bag $p$ is suitably held in place, within the dust separator casing $f$, by means of a frame consisting, as shown in Fig. 7, of a cylinder $q$, of cardboard, metal, or the like, provided with a perforated disk, such as marked $r'$ (Figs. 7 and 8) having the perforations covered with filtering fabric or gauze $r^2$. The piece of wire gauze or filtering fabric $i$, Fig. 1, is suitably interposed between the mouth of the bag $p$ which is inserted in the box or cylinder $q$ (Fig. 7) and the end or flange $f^2$ of the dust separator casing $f$. The filter bags $k$ and $p$ are, consequently, arranged in series or tandem-fashion and both are adapted to pulsate during the reciprocating action of the exhausting or vacuum producing pump. The frame or box $q$ is suitably held in place between the flange $f^6$ (on which the mouth of the bag $k$ rests) and the mouth of the bag $p$ which is in contact with the disk $i$.

Or instead of these tandem bags being both collapsible that one marked $k$, in Fig. 9, is made collapsible, while the other marked $p'$ is made somewhat longer than the length of the dust separator casing $f$. The spiral frame $l^5$ is also conveniently longer than the separator casing $f$. The bag $p'$ is provided, at the mouth, with a circular disk $i$ of gauze, fabric, or fibrous filtering material, which is conveniently, sewn to the bag $p$.' If desired, any of the other bags, herein referred to, may be so provided with a circular disk $i$ of filtering material. The bag $p'$ and frame $l^5$, being longer than the length of the dust separator casing, the bag is compressed by the perforated diaphragm $r'$ when in place and, if desired, the latter may have a spike or stud $r^3$ which sticks into the small end of the bag to prevent lateral displacement. This bag does not consequently pulsate when the pump is acting or, at least, not so freely as that marked $k$.

The cylinder $g$ is furnished with holes $g,'$ near the top thereof, for the free ingress and egress of air, and these holes are covered by an outwardly and downwardly projecting flange $g^2$, which may be soldered to the cylinder $g$ or held thereon by the retaining screws $g^3$, which serve to hold the plug $s$ to the cylinder. The upper end of the plug is, conveniently, in the form of a hollow cylinder $s'$ and has a handle $s^2$ of celluloid or the like mounted thereon. The plunger rod $t$ is similarly provided with a similarly shaped handle $t'$ and, in known manner, an india rubber ring *u* on the plunger rod *t* prevents shock and accidental squeezing of the operator's hand or finger, as the two handles *s*² and *t'* are brought together, when the cleaner is in use. The piston or plunger consists of, for example, a disk *v* of wood, preferably somewhat taper in section, axially, or it may be cylindrical and furnished with a rounded lower edge. The said plunger is provided with a hole for the plunger-rod *t* and the latter is furnished with an axial hole at its lower end. The plunger has a cup-leather *v,'* at its upper end, and the said cup-leather is held in place by the flange *w'* of a flanged sleeve *w*, mounted on the plunger-rod *t* on the top of the plunger the said sleeve being furnished with two diametrically opposite holes and the plunger rod being transversely drilled to correspond. A short rod *x*, having in the middle, a transverse, internally screw-threaded hole is passed through the holes in the sleeve and the transverse hole in the plunger rod. A screw *y*, with a washer *z* thereon, of an external diameter larger than that of the plunger rod *t*, is passed into the hole at the end of the plunger rod and screwd into the screw-threaded hole in the short rod *x*. The head of the screw, on coming into contact with the washer *z*, causes the latter to hold the plunger *v* and the cup-leather *v'* firmly on the plunger rod. If desired, there may also be another india-rubber ring *u'* on the sleeve *w*, between the short rod *x* and the plug *s*, to absorb the shock at the end of the return stroke. The transverse rod *x* serves the double purpose of aiding in holding together the plunger *v*, the cup-leather *v'* and the plunger or piston rod *t*, and of acting as a stop to limit the relative motion between the plunger and cylinder, so that, in no circumstances, is it possible for the cup-leather *v'* to cover the holes *g'*, thereby allowing free ingress and egress of air to and from the cylinder or barrel *f* during working.

In use, the cylinder is, as usual, moved forward and backward, being held in one hand by means of the hollow handle *s*² and the shoe *b* gliding over the carpet while the piston or plunger is held stationary, the handle *t'* being grasped by the other hand.

I claim:—

1. In a vaccuum cleaner, the combination with a dust receptacle having a lower tapering portion and an upper cylindrical portion, and a pump barrel detachably connected to the upper end of the latter, of a dust separator comprising a casing detachably mounted in said cylindrical portion, a valve in the top of the separator casing, a dust bag projecting into the lower portion of the receptacle, and a spiral spring frame connected to the lower end of the separator casing adapted to support the bag in parallel relation to the tapering portion of the dust receptacle.

2. In a vacuum cleaner, the combination with a dust receptacle having a lower tapering portion and an upper cylindrical portion and a pump barrel detachably connected to the upper end of the latter, of a dust separator comprising a casing detachably mounted in said cylindrical portion, a perforated diaphragm mounted in the upper end of the casing, a valve on the casing above the diaphragm, a sieve in the bottom of the casing, a dust bag on the casing below the sieve, and a spiral spring frame connected to the lower end of said casing and supporting the bag in parallel relation to the tapering portion of the dust receptacle.

3. In a vacuum cleaner, a dust separator comprising a casing, a perforated diaphragm in each end thereof, a valve mounted on one end of the casing, a spiral spring frame mounted on the other end of the latter, a dust separator bag mounted on and supported at its side by said frame, and means for detachably connecting the diaphragms and frame to the casing.

4. In a vacuum cleaner, a dust separator comprising a casing, a perforated diaphragm in each end thereof, a valve mounted on one end of the casing, a spiral spring frame mounted on the other end of the latter, a spiral spring frame mounted in the casing, and dust separator bags mounted on the frames.

5. In a vacuum cleaner, a dust separator comprising a cylindrical casing, a perforated diaphragm in each end thereof, a box mounted in the casing, a spiral frame in the box, a dust separator bag on said frame, a spiral spring frame connected with the bottom of the casing, and a dust separator bag mounted on the latter frame.

6. In a vacuum cleaner, a dust separator comprising a cylindrical casing, a perforated diaphragm at one end thereof, a box mounted in the casing and having a series of gauze covered perforations in its bottom, a spiral frame in the box, a dust bag on said frame, a spiral spring frame connected with the bottom of the casing, a dust separator bag mounted on the latter frame, and a deflector on the bottom of the last named bag.

7. In a vacuum cleaner, a single acting pump, a tapering dust separator bag collapsible in the direction of its axis by the intermittent suction stroke of the pump, and a collapsible spiral spring forming a tapering frame for the bag adapted to intermittently distend the latter against the action of the pump.

8. In a vacuum cleaner, a single acting pump, a plurality of tapering dust separator bags arranged in series and collapsible in the direction of their axes by the intermittent suction stroke of the pump, and a collapsible spiral spring for each bag forming a tapering frame therefor adapted to intermittently distend the bag against the action of the pump.

9. In a vacuum cleaner, a single acting pump, a plurality of tapering dust separator bags arranged in series and collapsible in the direction of their axes by the intermittent suction stroke of the pump, a spiral spring for each bag forming a tapering frame therefor, one of said frames adapted to intermittently distend its bag, the other frame being restrained from movement so as to form a rigid support for the other bag.

10. In a vacuum cleaner, a dust separator casing, a spiral spring frame mounted therein, a dust bag mounted on the frame, a spiral spring frame mounted on and extending below the casing, and a dust bag on the latter frame.

LOUIS DANIEL ASCOLI.